United States Patent
Collins et al.

[15] 3,660,967
[45] May 9, 1972

[54] PURIFICATION OF FLUID STREAMS BY SELECTIVE ADSORPTION

[72] Inventors: John J. Collins, Katonah; Stephen A. Conviser, Pelham; Richard A. Anderson, Katonah; Krishan D. Manchanda, Scarsdale, all of N.Y.

[73] Assignee: Union Carbide Corporation, New York, N.Y.

[22] Filed: Sept. 8, 1970

[21] Appl. No.: 70,052

[52] U.S. Cl. ............................................55/73, 55/68, 55/75
[51] Int. Cl. .........................................................B01d 53/02
[58] Field of Search ...............................55/68, 387, 73–75, 55/388; 260/676 AD, 676 MS, 677 AD

[56] References Cited

UNITED STATES PATENTS 3,392,508  7/1968  Scholten et al. ..........................55/73

Primary Examiner—Charles N. Hart
Attorney—Paul A. Rose, Robert C. Cummings and Richard G. Miller

[57] ABSTRACT

Zeolitic molecular sieve adsorption beds are employed with greatly enhanced efficiency in fluid stream purification operations by using a bed to selectively adsorb impurities from a first fluid stream and without regeneration of the bed passing a second impure fluid stream therethrough, the second fluid being a less strongly adsorbed material than the fluid of the first stream. For example, the first fluid stream can be an olefin stream containing sulfur compound impurities and the second a paraffin stream also containing sulfur compound impurities. When used in this manner, the bed exhibits a higher capacity for the impurities adsorption than would be predicted from the impurity adsorption loading from the individual streams.

9 Claims, 6 Drawing Figures

PATENTED MAY 9 1972　　　　　　　　　　　　　3,660,967
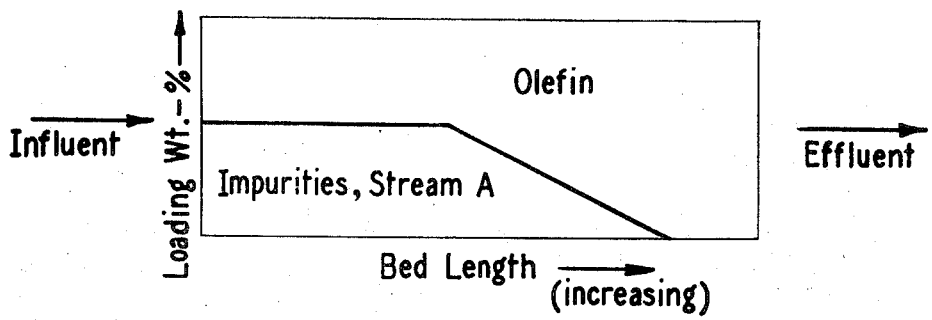
F I G. 1a.
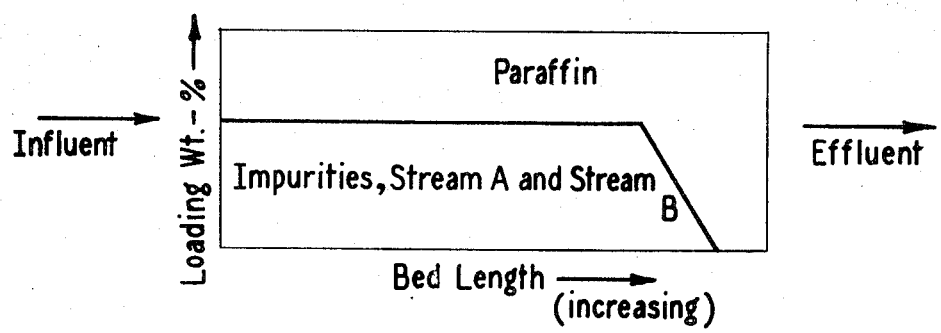
F I G. 1b.
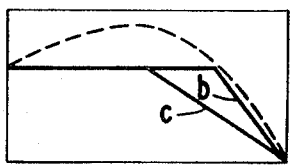
F I G. 2.
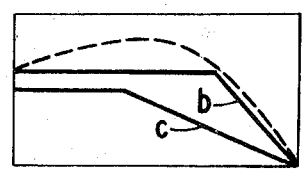
F I G. 3.
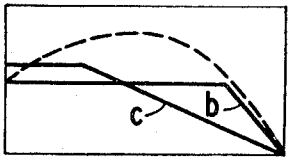
F I G. 4.
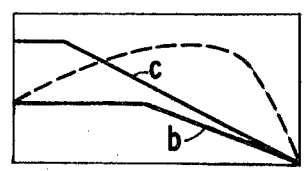
F I G. 5.
INVENTORS
JOHN J. COLLINS
STEPHEN A. CONVISER
RICHARD A. ANDERSON
KRISHAN D. MANCHANDA
BY Richard G. Miller
ATTORNEY

PURIFICATION OF FLUID STREAMS BY SELECTIVE ADSORPTION

The present invention relates in general to the removal of compounds present as impurities in hydrogen and hydrocarbon streams, and more particularly to the purification of these streams by selectively absorbing the impurities on zeolitic molecular sieve adsorbents.

Relatively small amounts of such materials as carbon dioxide, sulfur compounds, water, and highly unsaturated organic compounds are commonly present in hydrogen or hydrocarbon streams. The removal of these impurities is desirable for various reasons depending upon the intended use of the purified product. In the lower boiling paraffinic fuels such as propane and butane, an offensive odor is imparted by sulfur compounds such as $H_2S$ and lower alkyl mercaptans, and in addition, when these fuels are burned, atmospheric pollution commonly results. Similar pollution occurs when sulfur-containing gasolines are burned in automobile internal combustion engines. Further, in catalytic hydrocarbon conversion processes, sulfur has a deleterious effect upon the expensive catalysts employed. In isoparaffin alkylation processes, it is highly important that sulfur-containing impurities be absent from the feed stream to make full use of the catalysts. Isoparaffin alkylation produces high octane product for addition to gasolines in order that the octane-improving lead additives, which also cause pollution, need not be employed. The isobutane make-up to the alkylation feed is usually obtained by isomerization of butane over platinum and thus also requires desulfurization to avoid catalyst poisoning.

Carbon dioxide and/or water vapor in normally gaseous hydrocarbon streams which are liquefied for further use, form solids which block heat exchanger tubes and apparatus nozzles. In hydrogen streams intended for use in the synthesis of ammonia, $CO_2$ is reduced to CO which poisons the catalyst commonly employed to promote the reaction between hydrogen and nitrogen. Water vapor in any fluid stream which is brought into contact with zeolitic molecular sieve catalysts at high temperatures frequently causes some modification of the properties of the catalyst. Highly unsaturated organic molecules such as diolefins and acetylene polymerize and form coke on molecular sieve catalysts and decrease their activity.

For the purification of hydrogen or hydrocarbon streams, selective adsorption of the impurities on zeolitic molecular sieves is commonly utilized. Assuming the pore diameter of the molecular sieve is sufficiently large, molecules of the hydrocarbon stream to be purified compete with the impurity molecules for the sorption sites on the adsorbent with the result that the impurity molecules become dispersed throughout the adsorption bed and begin to emerge with the hydrocarbon effluent before the capacity of the bed for the impurity molecules is fully realized. The more strongly the hydrocarbon molecules are adsorbed compared to the impurity molecules, the more aggravated is the problem of inefficient bed utilization. Olefin streams or hydrocarbon streams containing substantial amounts of olefins are especially difficult to purify because the olefins are relatively strongly absorbed, thereby causing a long mass transfer zone for the impurity and also because of the tendency of olefins to polymerize and cause coke formation of the molecular sieve adsorbent. This problem is especially troublesome when hot purge gases are used in the desorption stroke. Coke deposits clog the pores of the zeolite and greatly inhibit its molecular sieve adsorption properties. Oxidative regeneration to remove the coke is both expensive, time-consuming and can, unless very carefully performed, destroy the crystallinity of the zeolite.

It is, therefore, the general object of the present invention to provide a process for purifying hydrogen and/or hydrocarbon feed streams using a molecular sieve adsorbent which utilizes the adsorbent bed more efficiently. When olefins are involved, the process also provides the advantage of less frequent need for oxidative regeneration of the adsorbent.

It is a more particular object to provide a highly efficient process for desulfurizing the olefin and paraffin feed streams intended for paraffin alkylation processes.

It is another particular object to provide a process for $CO_2$ removal from ethylene-propylene mixtures and from ethane-propane mixtures or natural gas streams.

It is another particular object to provide a process for removing sulfur compound impurities from naphtha, or natural gas condensate fractions and liquefied petroleum gas streams.

It is still another particular object to provide a process for drying cracked gas and natural gas.

Other objects will be obvious from the specification appearing hereinafter.

Broadly stated, the present invention provides a fixed bed molecular sieve adsorption process for the purification of fluid streams and/or recovery of an impurity from such fluid streams in which a first impure fluid feed containing a strongly adsorbed impurity component and a less strongly adsorbed major component (A) is passed into a fixed bed of molecular sieve adsorbent to adsorb the impurity and a portion of the less strongly adsorbed major component as a first adsorption stroke, and without intervening desorption of the impurity from the bed, as a second adsorption stroke, a second impure fluid feed containing a strongly adsorbed impurity component and a major component (B) which is less strongly adsorbed than major component (A) in the first fluid stream is passed into the molecular sieve bed in a cocurrent direction to adsorb additional impurity component and simultaneously desorb previously adsorbed component (A). The bed is thereafter desorbed of the component (B) and the impurity by conventional techniques.

The impurities to be removed from the hydrogen and hydrocarbon streams in accordance with this invention are primarily those ordinarily found in association with petroleum and natural gas and, thus, are present in the various fractions treated in a petroleum refining or natural gas processing installation. Sulfur compounds are probably the most prevalent impurities and include $H_2S$, $SO_2$, $CO_2$, thiophene, thiophenol, mercaptans, particularly the lower alkyl mercaptans having from one to five carbon atoms, and also sulfides and disulfides. $H_2O$ and $CO_2$ are also very common impurities in hydrogen and hydrocarbon streams. In significant amounts, the di- or polyolefins such as butadiene and the compounds containing acetylenic unsaturation are also included as impurities within the scope of the present invention. It is to be understood, however, that any undesired compound in a hydrogen or hydrocarbon stream in low concentration is an impurity, and streams containing these compounds can be treated in accordance with the present invention provided the impurities are adsorbed preferentially over the key or main hydrocarbon of the first treated stream in the sequential adsorption procedure, and are not unduly destructive of the molecular sieve adsorbent. In general, it is preferred that the impurities of the two streams being sequentially treated be non-reactive with each other under the conditions of the puridication process. Such reactions can lead to corrosion problems, adsorbent deterioration and physical blocking of the zeolite pores. Further, the present process is a purification process as distinguished from a bulk separation process and by the term purification as used herein in the specification and claims it is meant that the impurities removed from the hydrocarbon or hydrogen streams constitute less than about 2 mole percent of the stream involved.

The hydrocarbon streams suitably treated can be any olefin, paraffin (including cycloparaffins and isoparaffins) or aromatic compounds or mixtures thereof which are conventionally treated by passage through molecular sieve beds at temperatures of less than about 100° C. Particularly suitable are petroleum naphthas, both light and heavy, natural gasoline, natural gas condensates, liquefiable petroleum gas, natural gas and cracked hydrocarbon gas streams obtained by thermally decomposing hydrocarbons to produce olefins. As is well known in the art, these streams have no precise composition and vary depending upon their origin. Their various compositions are, with the exception of content of impurity hereinbefore defined, all within the scope of the present invention.

The molecular sieve adsorbent in the adsorption bed is selected with regard for the molecular dimensions of the particular compounds present as impurities, but is not a narrowly critical factor. Many impurities such as $H_2S$, $H_2O$, $CH_3SH$, $CO_2$ and the like can be effectively adsorbed in a 4 angstrom pore zeolite. All of the compounds commonly present as impurities in petroleum derived hydrocarbon streams are readily adsorbed by some species of molecular sieve, the known types having pore diameters ranging from about 4 to about 15 angstroms. By the term molecular sieve adsorbent is meant a three-dimensional crystalline zeolitic aluminosilicate from which the water of hydration can be removed without collapse of the crystal lattice thereby providing internal cavities interconnected by pores and capable of receiving and holding in the adsorbed state molecular species other than and in addition to water. Illustrative of the molecular sieves suitably employed, either alone or in combinations of two or more zeolite A, U.S. Pat. No. 2,882,243; zeolite X, U.S. Pat. No. 2,882,244; zeolite R, U.S. Pat. No. 3,030,181; zeolite S, U.S. Pat. No. 3,054,657; zeolite T, U.S. Pat. No. 2,950,952; zeolite F, U.S. Pat. No. 2,996,358; zeolite B, U.S. Pat. No. 3,008,803; zeolite Q, U.S. Pat. No. 2,991,151; zeolite M, U.S. Pat. No. 2,995,423; zeolite H, U.S. Pat. No. 3,010,789; zeolite J, U.S. Pat. No. 3,011,809; zeolite Y, U.S. Pat. No. 3,130,007; zeolite L, U.S. Pat. No. 3,216,789; zeolite K-G, U.S. Pat. No. 3,056,654 and synthetic mordenite. Naturally occurring zeolites suitably employed are chabazite, gmelinite, mordenite, clinoptilolite, phillipsite and faujasite. The foregoing zeolites can be utilized in the cation form in which they are produced synthetically or occur naturally or in their cation exchanged forms which are well known in the art.

The sequential adsorption steps can be carried out either in the liquid or the vapor phase or either step can be liquid phase and the other vapor phase. It is preferred, however, that if the first adsorption stroke is in the vapor phase, the second adsorption stroke also be in the vapor phase. Temperatures are preferably kept relatively low since the capacity of the adsorbent is greater for an adsorbate at lower temperatures. Generally, temperatures between about −40° and 100° C. are suitably employed. The temperature of the second of the two sequentially treated streams should be such that the effect of contact of the fluid of the second stream with the adsorbent containing first stream adsorbate is not to create a heat zone in the bed. In some cases, the net effect of contact by the second stream is a bed cooling. Pressure conditions are not at all critical, but for liquid phase operation, the pressure must be commensurate with the temperature (below the critical temperature of the hydrocarbons involved) to insure the liquid state. Also, the higher the partial pressure of the adsorbate, the greater the capacity of the molecular sieve therefore. In general, pressures of from about 1 to about 100 atmospheres are employed.

The loading of an adsorbate in a fixed bed of molecular sieve in a fluid flow through contacting process is normally characterized by an equilibrium zone and a mass transfer zone. The equilibrium zone is that part of the bed in which the composition of the flowing fluid stream is essentially unchanging and is substantially the same as the feed fluid stream as regards the concentration of the adsorbable impurity. The mass transfer zone is that part of the bed in which the concentration of the adsorbable impurity is changing in the fluid stream. In a particular fixed bed of molecular sieve adsorbent, breakthrough loading is the weight percent loading of adsorbable impurity per weight of adsorbent in the combined equilibrium and mass transfer zones when the leading edge of the mass transfer zone reaches the end of the particular fixed bed. Equilibrium loading is the weight percent loading of adsorbable impurity per weight of adsorbent in an equilibrium zone. The foregoing considerations are applicable to the process of the present invention and the various terms defined therein are intended to have the same meaning throughout the description of the present process.

The overall process is more easily illustrated using one of the preferred embodiments, namely that of desulfurizing the feed streams to a catalytic isoparaffin alkylation reactor wherein an olefin and a branched chain paraffin are reacted to obtain a highly branched chain paraffin having a higher molecular weight than the isoparaffin employed as the initial reactant. Although it is preferred to alkylate a relatively pure isobutane feed stock, isobutane as the key component in combination with other isoparaffins can suitably be employed. Advantageously, since the major alkylate products ideally consists of $C_6$–$C_8$ hydrocarbons, the feed is typically essentially free of isoparaffins having more than five carbon atoms or at least the concentration of these isoparaffins is small. The olefinic alkylating agent is ordinarily butene, but ethylene, propylene and amylene, in admixture with each other and/or butene is sometimes used. The alkylating olefin is commonly in admixture with paraffins of the same molecular species as are present in the paraffin stream.

The sulfur impurities present in the hydrocarbons can include $H_2S$, COS, methyl mercaptan, ethyl mercaptan, propyl mercaptan, butyl mercaptan and higher alkyl mercaptans up to about five carbon atoms, aromatic mercaptans such as thiophenol and heterocyclic sulfur compounds such as thiophene are also included. Sulfides and disulfides may also be present. In addition to sulfur compounds, water is a common impurity in alkylation feed streams. Two typical olefin streams used in isoparaffin alkylation comprise:

| Constituent | Propylene-Butylene Mixed Feed | Butylene Feed |
| --- | --- | --- |
| propylene | 16.5 LV % | 0.8 LV % |
| propane | 12.9 LV % | 1.5 LV % |
| butene | 28.0 LV % | 47.6 LV % |
| n-butane | 9.2 LV % | 11.2 LV % |
| i-butane | 25.9 LV % | 36.6 LV % |
| pentenes | 2.8 LV % | — |
| i-pentane | 4.4 LV % | 2.2 LV % |
| heaviers | 0.3 LV % | 0.1 LV % |
| sulfur cmpds. | 50 to 2000 p.p.m. | 50 to 2000 p.p.m. |
| $H_2O$ | saturated | saturated |

A typical butane stream which can be catalytically converted for use as alkylation feed comprises:

| | |
| --- | --- |
| i-butane | 95 LV % |
| n-butane | 5 LV % |
| sulfur cmpds. | 50 to 2000 p.p.m. |
| $H_2O$ | saturated |

While this example is described in terms of the use of a single bed, in commercial application a multi-bed system would probably be used to provide a continuous supply of reactants to an alkylation process. Each bed of a multi-bed system would undergo the same series of steps as a single bed system, but in a staged relationship. In this particular exemplification, the two hydrocarbon feed streams have the following compositions:

FEED STREAM A

| Component | Mole Fraction |
| --- | --- |
| propane | 2.4 |

| | |
|---|---|
| propylene | 2.2 |
| i-butane | 29.5 |
| n-butane | 23.3 |
| i-butene | 20.5 |
| butene-1 | |
| trans-butene | 10.6 |
| cis-butene-2 | 7.4 |
| iso-pentane | Balance |
| butadiene | 0.1 |
| $H_2O$ | Saturated at 75° F. |
| methyl mercaptan | 1000 p.p.m. (wt.) |

FEED STREAM B

| Component | Mole Fraction |
|---|---|
| propane | 3.8 |
| i-butane | 22.0 |
| n-butane | 71.6 |
| i-pentane | 2.7 |
| $H_2O$ | Saturated at 75° F. |
| methyl mercaptan | 500 p.p.m. (wt.) |

An adsorption bed containing pelletized zeolite X molecular sieve is pressured with an inert gas such as natural gas, nitrogen, argon or helium and flow through conditions established. A small quantity of Feed Stream B is injected into the inert gas entering the chamber to be adsorbed on the molecular sieve at a relatively low concentration level of 1 to 10 weight percent. This pre-adsorption of a nonolefinic hydrocarbon serves to limit the temperature rise of the molecular sieve when the first adsorption step unsaturate containing feed is admitted. Then Feed Stream A is admitted to the pressurized, preloaded molecular sieve chamber under liquid conditions (75° F., 100 psig.) and flows through the molecular sieve bed. The water, sulfur compounds and diolefin impurities and some of the ethylenically unsaturated hydrocarbons are adsorbed by the Type X molecular sieve. Purified olefin is taken off at the upper end of the chamber. This step may be continued until sulfur compound impurity appears in the product at a selected breakthrough concentration or the step can be terminated earlier. In FIG. 1a the loading on the bed in the case of sulfur compound pre-breakthrough adsorption is illustrated graphically. The second adsorption step, using Feed Stream B in liquid phase is then admitted cocurrently, and the impurities are adsorbed by the adsorbent while most of the adsorbed ethylenically unsaturated hydrocarbons from adsorption step 1 are eluted from the molecular sieve bed by the liquid paraffin stream. Purified paraffin is taken off of the bed with a diminishing concentration of the eluted unsaturate therein. Optionally, the liquid can be drained from the bed before admission of Stream B. Adsorption step 2 can be continued until sulfur compound impurity appears in the effluent at a selected breakthrough concentration, or step 2 can be terminated at any point between elution of unsaturates and sulfur compound breakthrough. At this point, the molecular sieve contains the impurities from both feeds A and B and the chamber is filled with feed liquid B. This state is shown graphically in FIG. 1b. The liquid is drained from the bed and the molecular sieve regenerated by passing a hot inert purge gas through the bed at temperatures in the range of about 350° to 750° F., in a countercurrent or cocurrent direction, preferably in a cocurrent direction. The bed may then be cooled by cool gas purging and pre-loading with purified paraffin as before.

It is surprisingly found that the ability of the zeolite adsorbent bed to desulfurize the paraffin feed stream after being loaded with impurities from the olefin stream is not directly related to the sulfur compound equilibrium loadings out of the individual streams. When the breakthrough loading of the impurities out of the paraffin stream is greater than the breakthrough loading of impurities out of the olefin stream, it is found that the total loading on the bed at breakthrough can be much greater than the loading at breakthrough for the paraffin stream which theory would indicate to be the maximum bed utilization. Even more surprising is the finding that when the impurities breakthrough loading out of the olefin stream is greater than out of the paraffin stream, the bed still adsorbs impurities from the second adsorption stroke using the paraffin feed stream. The foregoing phenomena are illustrated by the following examples: In each example, the olefin feed stock consisted of equal parts by liquid volume of isobutane and 1-butene with various concentrations of either $H_2S$ or methyl mercaptan as the sulfur compound impurity. In each example also, the paraffin feed stock consisted of isobutane also containing various concentrations of $H_2S$ or $CH_3SH$ impurity. In all examples, the olefin feed was first passed through a bed of sodium zeolite X pellets until breakthrough of the sulfur-compound impurity occurred at a pre-selected sampling tap in the bed wall. Taps along the bed were placed at 30, 42 and 60.8 inches respectively from the influent end of the bed. Thereafter, the paraffin stream was passed through the bed to displace the adsorbed olefin and to be purified of sulfur compounds. The pertinent operating conditions are summarized in Table I infra. In FIG. 2, FIG. 3, FIG. 4 and FIG. 5 respectively, are shown the bed profiles of the sulfur compound loading from the individual olefin stream (designated by "c" in all FIGS.), from the individual paraffin stream (designated by "b" in all FIGS.), in accordance with theory, and the increased sulfur-compound loading due to the operation of the process of the present invention (designated by a dotted line in all FIGS.) for Examples 1 through 4. It is particularly to be noted that in Example 4 that both the equilibrium loading from the olefin feed stock and the calculated breakthrough loading from the olefin feed stock were greater than the corresponding parameters for the paraffin feed stock. Even so, the bed was demonstrated to have additional capacity for sulfur compounds after breakthrough occurred using the olefin feed stock.

In the drawings, the graphic representations are not intended to provide scalar values for adsorbent bed loadings, but rather are intended only to show the nature of the improved results attainable using the present process.

In those instances in which at least the first of the sequentially treated feed streams is a hydrocarbon stream, there will be adsorbed hydrocarbon in the bed at breakthrough of the impurity. These hydrocarbons, particularly if they are olefinic, become to some degree thermally and catalytically degraded to coke during the hot gas purge to desorb and clean the bed of the impurity component. After several cycles, the adsorbent can be sufficiently inactivated by coke deposits to require oxidative regeneration. If the impurity itself is a highly unsaturated material such as acetylene or a diene, coking will be severe. To avoid, to a considerable degree, the coking problem, a water pulse type of purge desorption can be utilized. In accordance with this procedure, water vapor is placed on the bed, if not already present as an impurity material from the prior sequential adsorption strokes, at the end of the bed through which the hot purge gas will be subsequently introduced. The quantity of water is not narrowly critical, but should be sufficient to form a well defined front. As a desorption stroke a hot gas purge is introduced into the bed such that the adsorbed water front is between the hot purge gas and any adsorbed hydrocarbon. As the temperature increases, the more strongly held water will be desorbed and a water desorption front established at one end of the bed. The moisture from this desorption front will be readsorbed by the cooler molecular sieve in a moving water adsorption front further down the bed and the water "pulse" which is created because of the continual desorption and adsorption of the water molecules is caused to move longitudinally through the bed by the hot purge gas. As such water-adsorption front of the water pulse progresses through the bed, the hydrocarbons in the bed are continually desorbed, in favor of the more strongly held water. The result is that the hot purge gas never comes in contact with the hydrocarbons since the water acts as a buffer, and coking is substantially eliminated.

SUMMARY OF THE OPERATING CONDITIONS FOR EVALUATING MULTISTREAM PROCESS

| Particulars | Example | | | |
|---|---|---|---|---|
| | 1 | 2 | 3 | 4 |
| Olefin feed: | | | | |
| i-$C_4$, LV percent | 50 | 50 | 50 | 50 |
| i-$C_4$ | 50 | 50 | 50 | 50 |
| $H_2S$, p.p.m. (wt.) | 730 | 770 | 575 | |
| $CH_3SH$, p.p.m. (wt.) | | | | 1,230 |
| Paraffin feed: | | | | |
| i-$C_4$, LV percent | 100 | 100 | 100 | 100 |
| $H_2S$, p.p.m. (wt.) | 330 | 600 | 120 | 620 |
| Bed size, diameter, inch | 1.05 | 1.05 | 1.05 | 1.05 |
| Packed length, inch | 60.8 | 60.8 | 60.8 | 32 |
| Activated bed weight, gm | 559.5 | 560 | 556.9 | 296 |
| Bed bulk density, lb./ft.[3] | 40.6 | 40.6 | 40.3 | 40.6 |
| Flow rate, cc./min. (liq.) | 100 | 100 | 100 | 100 |
| Operating pressure, p.s.i.g | 105 | 105 | 105 | 105 |
| Operating temperature, °F | Room temperature=75° F. | | | |
| Olefin feed: | | | | |
| Equilibrium loading wt. percent[1] | 2.9 | 3.0 | 2.6 | 7.4 |
| Predicted breakthrough time, min | [2]250 | [3]122 | [3]179 | [4]167 |
| Actual breakthrough time, min | [2]234 | [3]132 | [3]180 | [4]180 |
| Calculated breakthrough loading, wt. percent | 1.9 | 1.4 | 1.5 | 4.3 |
| Actual breakthrough loading, wt. percent | 1.8 | 1.5 | 1.5 | 4.5 |
| Paraffin feed: | | | | |
| Equilibrium loading, wt. percent | 2.7 | 4.0 | 1.7 | 4.1 |
| Calculated breakthrough loading, wt. percent[1] | 2.3 | 3.4 | 1.6 | 4.0 |
| Calculated breakthrough time (due to the difference in the breakthrough loading of the two feeds) | [2]120 | [3]180 | [3]15 | ([5]) |
| Actual breakthrough time, min | [2]345 | [3]250 | [3]>280 | [4]197 |
| Actual breakthrough loading, wt. percent | 3.4 | 4.5 | >2.4 | 6.7 |

[1] Calculated graphically.
[2] 60.8 inches of bed.
[3] 42 inches of bed.
[4] 30 inches of bed.
[5] Immediate.

When various other plural stream systems are processed, as were the alkylation feed streams in the example hereinbefore, similar benefits in more efficient adsorbent bed usage are attained. As a further example, a sour natural gasoline feed consisting essentially of $C_4$ to $C_9$ saturated hydrocarbons, principally $C_5$ and $C_6$ hydrocarbons, and about 600 ppm sulfur compounds (calculated as sulfur), principally mercaptans, disulfides and thioethers, is fed in liquid phase to a molecular sieve adsorption bed and the purified effluent hydrocarbon removed from the bed until breakthrough (about 10 ppm as sulfur) principally lower alkyl mercaptans is passed cocurrently through the bed. The lower paraffins desorb and remove the higher molecular weight paraffins from the natural gasoline first stream and also is itself removed in purified form from the effluent end of the bed until sulfur compound again occurs. The bed is drained and the sulfur compound impurities are desorbed using a hot gas purge, such as hydrogen, methane, nitrogen and mixtures such as natural gas.

In like manner, a refinery fuel line mixture comprising the normally gaseous reject hydrocarbons having an average molecular weight greater than methane from varied sources within the refinery and containing $H_2S$ and mercaptans in as high a concentration and varying amounts of unsaturates such as ethylene and acetylene, is used in the gas phase as the first stream in the process of this invention. As the second stream used to desorb non-impurity constituents of the first stream from the bed and also at the same time be purified, is a natural gas stream consisting essentially of $CH_4$ and $H_2S$ as an impurity in an amount of about 500 ppm. The natural gas desorbs the unsaturated impurities from the bed and is itself purified of sulfur compound impurities to meet pipeline specifications, i.e., about 4–5 ppm $H_2S$ calculated as sulfur.

A third system involves the removal of $CO_2$ from a gas phase ethylene stream containing about 40 ppm $CO_2$ as impurity and a sweet natural gas stream containing about 1.5 wt.-% $CO_2$. When it is desired, as with each of the present streams, to liquefy ethylene and natural gas, the presence of $CO_2$ in even relatively minor amounts causes serious problems by becoming a line-blocking solid. Since $CO_2$ is adsorbed on zeolitic molecular sieve adsorbents and further, since only very low concentrations of $CO_2$ are permissible in such gases, the process of this invention is especially suitable. Using the ethylene stream as the first purified stream, the natural gas stream removes ethylene from the bed after the first adsorption stroke and avoids a potential problem with undue bed coking. The natural gas is at the same time purified to specification requirements and the bed is more efficient in its capacity for $CO_2$.

What is claimed is:

1. Adsorption purification process which comprises as a first adsorption stroke passing a first impure fluid feed containing a strongly adsorbed impurity component and a less strongly adsorbed major component (A) into a bed of zeolitic molecular sieve adsorbent to adsorb the said impurity and a portion of the less strongly adsorbed major component (A) and without intervening desorption of the impurity from the bed, as a second adsorption stroke, a second impure fluid feed containing a strong adsorbed impurity component and a major component (A) which is less strongly adsorbed than said major component (A) is passed into the adsorbent bed in a cocurrent direction to adsorb impurity from said second impure fluid feed and simultaneously desorb the previously adsorbed portion of component (A), and thereafter desorbing at least a portion of the total adsorbed impurity from both fluid streams.

2. Process according to claim 1 wherein the first adsorption stroke is continued essentially to the point where breakthrough of the impurity in the first fluid stream occurs.

3. Process according to claim 2 wherein the impurities in both of the two impure fluid streams purified by sequential adsorption strokes consist essentially of at least one sulfur compound of the group consisting of $H_2S$ and alkyl mercaptans containing from one to five carbon atoms.

4. Process according to claim 3 wherein the first fluid stream purified by sequential adsorption strokes is a hydrocarbon stream having as a key component a mono-olefin having from one to five carbon atoms and the second fluid stream sequentially purified comprises a paraffin having from one to five carbon atoms.

5. Process according to claim 4 wherein both the first and second fluid streams are in the liquid phase.

6. Process according to claim 3 wherein the first fluid stream comprises a naphtha petroleum fraction and the second fluid stream comprises liquefied petroleum gas.

7. Process according to claim 3 wherein the first fluid stream comprises a mixture of normally gaseous saturated hydrocarbons having an average molecular weight larger than methane and the second fluid stream is natural gas.

8. Process according to claim 2 wherein the impurity in both of the two impure fluid streams purified by sequential adsorption strokes consists essentially of $CO_2$.

9. Process according to claim 8 wherein the first fluid stream consists essentially of ethylene and the second fluid stream consists essentially of natural gas.

* * * * *

PO-1050
(5/69)

UNITED STATES PATENT OFFICE
CERTIFICATE OF CORRECTION

Patent No. 3,660,967            Dated May 9, 1972

Inventor(s) John J. Collins et al.

It is certified that error appears in the above-identified patent and that said Letters Patent are hereby corrected as shown below:

Column 8, line 27, delete "component (A)" and insert therefor -- component (B) --.

Signed and sealed this 25th day of July 1972.

(SEAL)
Attest:

EDWARD M. FLETCHER, JR.        ROBERT GOTTSCHALK
Attesting Officer               Commissioner of Patents